US005979369A

United States Patent [19]
Wittchow et al.

[11] Patent Number: 5,979,369
[45] Date of Patent: Nov. 9, 1999

[54] ONCE-THROUGH STEAM GENERATOR HAVING SPIRALLY DISPOSED EVAPORATOR TUBES

[75] Inventors: Eberhard Wittchow, Erlangen; Rudolf Kral, Forchheim, both of Germany

[73] Assignee: Seimens Aktiengesellschaft, Munich, Germany

[21] Appl. No.: 09/109,582

[22] Filed: Jul. 2, 1998

Related U.S. Application Data

[63] Continuation of application No. PCT/DE96/02435, Dec. 17, 1996.

[30] Foreign Application Priority Data

Jan. 2, 1996 [DE] Germany ............................ 196 00 004

[51] Int. Cl.[6] ....................................................... F22B 37/00
[52] U.S. Cl. .............. 122/235.12; 122/6 A; 122/235.23; 165/146; 165/169
[58] Field of Search .................................... 165/169, 146; 122/6 A, 235.12, 235.23

[56] References Cited

U.S. PATENT DOCUMENTS

| | | |
|---|---|---|
| 4,191,133 | 3/1980 | Stevens . |
| 4,987,862 | 1/1991 | Wittchow et al. . |
| 5,662,070 | 9/1997 | Kastner et al. .......................... 122/6 A |
| 5,701,508 | 12/1997 | Kohler et al. ....................... 122/235.23 |
| 5,706,766 | 1/1998 | Koehler et al. . |
| 5,735,236 | 4/1998 | Kastner et al. .......................... 122/6 A |

FOREIGN PATENT DOCUMENTS

| | | |
|---|---|---|
| 0 503 116 | 9/1992 | European Pat. Off. . |
| 2 032 891 | 2/1971 | Germany . |
| 42 36 835 | 5/1994 | Germany . |

OTHER PUBLICATIONS

"Modified Correlations for Void and Two–Phase Pressure Drop" (Rhouhani), AB Nuclear Energy Sweden, Mar. 1969.
"Evaporator Concepts for Benson–Steam Generators-"(Franke et al.), VGB Power Plant Technology, vol. 73, No. 4, pp. 352–361.

*Primary Examiner*—Leonard Leo
*Attorney, Agent, or Firm*—Herbert L. Lerner; Laurence A. Greenberg

[57] ABSTRACT

A once-through steam generator includes a gas flue formed of steam generator tubes welded to one another in a gas-tight manner through fins. The steam generator tubes are connected in parallel for the throughflow of a flow medium, they have a surface structure on their inside for generating a high flow turbulence in the medium flowing through them and they are disposed approximately in a spiral coil in a firing region of the gas flue. The steam generator tubes are constructed in such a way that, when they are in operation, the geodetic pressure loss of the medium flowing through them is at least 0.5 times their pressure loss due to friction. This ensures that such a once-through steam generator can also be operated in low load states of, for example, about 20% of the design load, without excessive thermal stresses occurring.

2 Claims, 3 Drawing Sheets

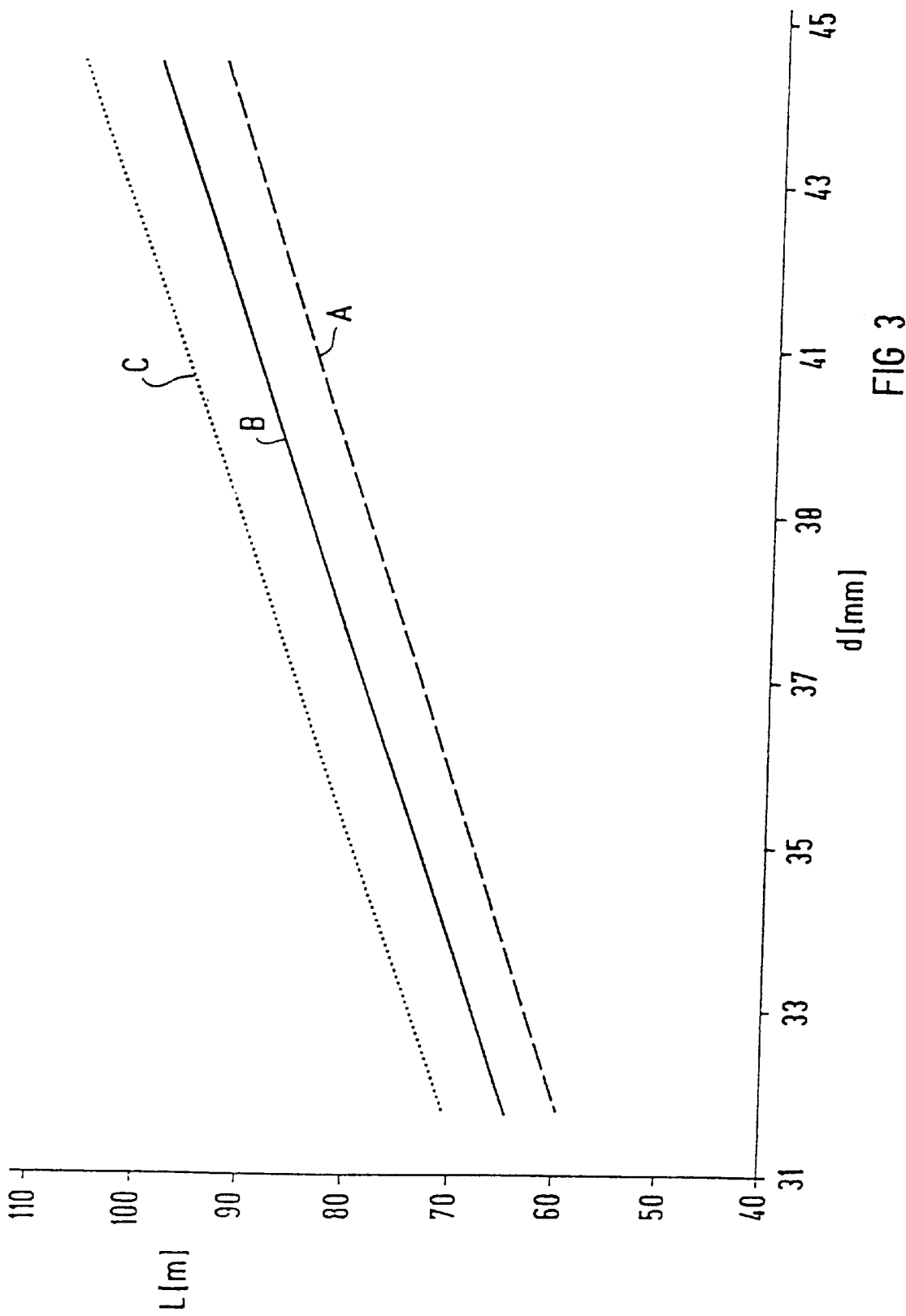

ONCE-THROUGH STEAM GENERATOR HAVING SPIRALLY DISPOSED EVAPORATOR TUBES

CROSS-REFERENCE TO RELATED APPLICATION

This application is a continuation of International Application PCT/DE96/02435, filed on Dec. 17, 1996, which designated the United States.

BACKGROUND OF THE INVENTION

1. Field of the Invention

The invention relates to a once-through steam generator including a gas flue formed of steam generator tubes welded to one another in a gas-tight manner through fins, the steam generator tubes connected in parallel for the throughflow of a flow medium, having a surface structure on their inside for generating a high heat transfer from their inner wall surface to the flow medium and disposed approximately in a spiral coil in a firing region of the gas flue.

Smooth tubes are normally used in the combustion chamber walls of a once-through steam generator which are composed of spirally disposed-steam generator tubes in a firing region. However, a configuration of that type is only suitable for load states of normally more than about 40% of the design load of the once-through steam generator due to the heat transfer properties of a smooth tube when the flow velocity of a medium flowing in it is low. Below that minimum load of about 40% of the design load, a circulating mode is normally superposed on the once-through mode of the steam generator, so as to ensure sufficient cooling of the steam generator tubes. However, switching to a circulating mode in that way leads to a lowering of the fresh-steam temperature of the once-through steam generator of about 80° C.

However, it may be necessary to construct the once-through steam generator in such a way that it can be operated at a sufficiently high fresh-steam temperature even in load states of more than 20% of the design load. That is done particularly in order to avoid nighttime shutdowns of a power plant supplied by the once-through steam generator. That is made possible by the use of those steam generator tubes which have a surface structure on their inside, for example in the form of ribs (internally ribbed tubes), for generating a high heat transfer from their inner wall surface to the flow medium. The use of such steam generator tubes with internal ribbing in a once-through steam generator having vertically disposed evaporator tubes is known, for example, from Published European Patent Application 0 503 116 Al, corresponding to U.S. application Ser. No. 08/151,257, filed Nov. 12, 1993. However, a steam generator tube with internal ribbing has a markedly higher pressure loss due to friction in comparison with a smooth tube. In the case of multiple heating of a steam generator tube, such an increased pressure loss due to friction may lead to temperature differences between adjacent tubes, in particular at an outlet of an evaporator. That is due to fluctuations in the mass flow of the medium flowing through the tube. Those temperature differences may cause damage due to inadmissible thermal stresses.

SUMMARY OF THE INVENTION

It is accordingly an object of the invention to provide a once-through steam generator having spirally disposed evaporator tubes, which overcomes the hereinafore-mentioned disadvantages of the heretofore-known devices of this general type and during the operation of which particularly low temperature differences occur at an outlet of adjacent steam generator tubes even in low load states of, for example, about 20% of the design load of the once-through steam generator.

With the foregoing and other objects in view there is provided, in accordance with the invention, a once-through steam generator, comprising a gas flue having a firing region, steam generator tubes with a length L and an outside diameter d, and fins gas-tightly welding the steam generator tubes to one another; the steam generator tubes connected in parallel for a throughflow of a flow medium; the steam generator tubes having an inner wall surface and an inner surface structure for generating a high heat transfer from the inner wall surface to the flow medium; the steam generator tubes disposed approximately in a spiral coil in the firing region; and each of the steam generator tubes constructed in such a way that points in a coordinate system, determined by pairs of values of the tube length L in the firing region and the outside diameter d of the tube, lie approximately along a straight line defined as follows: points determined by pairs of values L=59.7 m, d=31.8 mm and L=93.6 m, d=44.5 mm for a fin width of 12 mm; points determined by pairs of values L=64.7 m, d=31.8 mm and L =99.8 m, d=44.5 mm for a fin width of 16 mm; and points determined by pairs of values L=70.6 m, d=31.8 mm and L =106.9 m, d=44.5 mm for a fin width of 20 mm.

In this case, the tube length is the length of the steam generator tube between an initial value and a final value. The initial value is defined by the transition of an ash funnel mounted underneath the gas flue into the gas flue, to which a third of the height of the ash funnel is added. The final value is defined either by the transition of the spirally disposed steam generator tubes into a vertical configuration or by the tubes being connected to one another in pressure terms, for example through the use of a collecting vessel.

The once-through steam generator may have steam generator tubes with a particularly large or a particularly small wall thickness or an ash funnel with a particularly large or a particularly small angle of inclination of its outer walls. In order to ensure that such a once-through steam generator can also be operated reliably in low load states of about 20% of its design load, the tube length of each steam generator tube expediently deviates by no more than 15% from the tube length defined by the relevant straight line. In the case of a fin width other than those mentioned, the tube length is expediently extrapolated or interpolated linearly with the fin width from the given straight lines.

The invention proceeds from the consideration that a temperature difference between the outlet of a multiply heated steam generator tube and the outlet of a normally or averagely heated steam generator tube, is particularly low when the multiple heating of the steam generator tube reduces the mass flow density flowing in the latter to only a slight extent. The mass flow density of a multiply heated steam generator tube decreases because the pressure loss due to friction of the steam generator tube in question increases as a result of the multiple heating. However, since the total pressure loss in a steam generator tube is composed of a pressure-loss component "pressure loss due to friction" and of a pressure-loss component "geodetic pressure loss", the effect of a multiple heating of a steam generator tube on its mass flow density can be reduced if the pressure-loss component "geodetic pressure loss" of the total pressure loss is sufficiently high. A sufficiently high pressure-loss component "geodetic pressure loss" of, for example, more than 0.5 times the pressure loss due to friction can be achieved through the use of an appropriate construction of the steam generator tubes.

The pressure loss due to friction of a steam generator tube can be determined, for example, according to the following publications: "Druckverlust in glatten und innenberippten Verdampferrohren" [Pressure Loss in Smooth and Internally Ribbed Evaporator Tubes] by Q. Zheng et al.; "Wärme- und Stoffübertragung" [Heat and Mass Transfer] 26, pages 232 to 330, Springer Verlag 1991; and "Modified Correlations for Void-Fraction and Two-Phase Pressure Drop", AE-RTV-841 (1969) by Z. Rouhani.

In accordance with a concomitant feature of the invention, the inside diameter of the steam generator tubes is larger in an upper region of the firing region of the combustion chamber than in a lower region. This is done in order to further improve the flows through all of the steam generator tubes in the case of small temperature differences between multiply heated and normally heated steam generator tubes.

Other features which are considered as characteristic for the invention are set forth in the appended claims.

Although the invention is illustrated and described herein as embodied in a once-through steam generator having spirally disposed evaporator tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a graph of a coordinate system with curves A, B and C.

DESCRIPTION OF THE PREFERRED EMBODIMENTS

Figure 1:
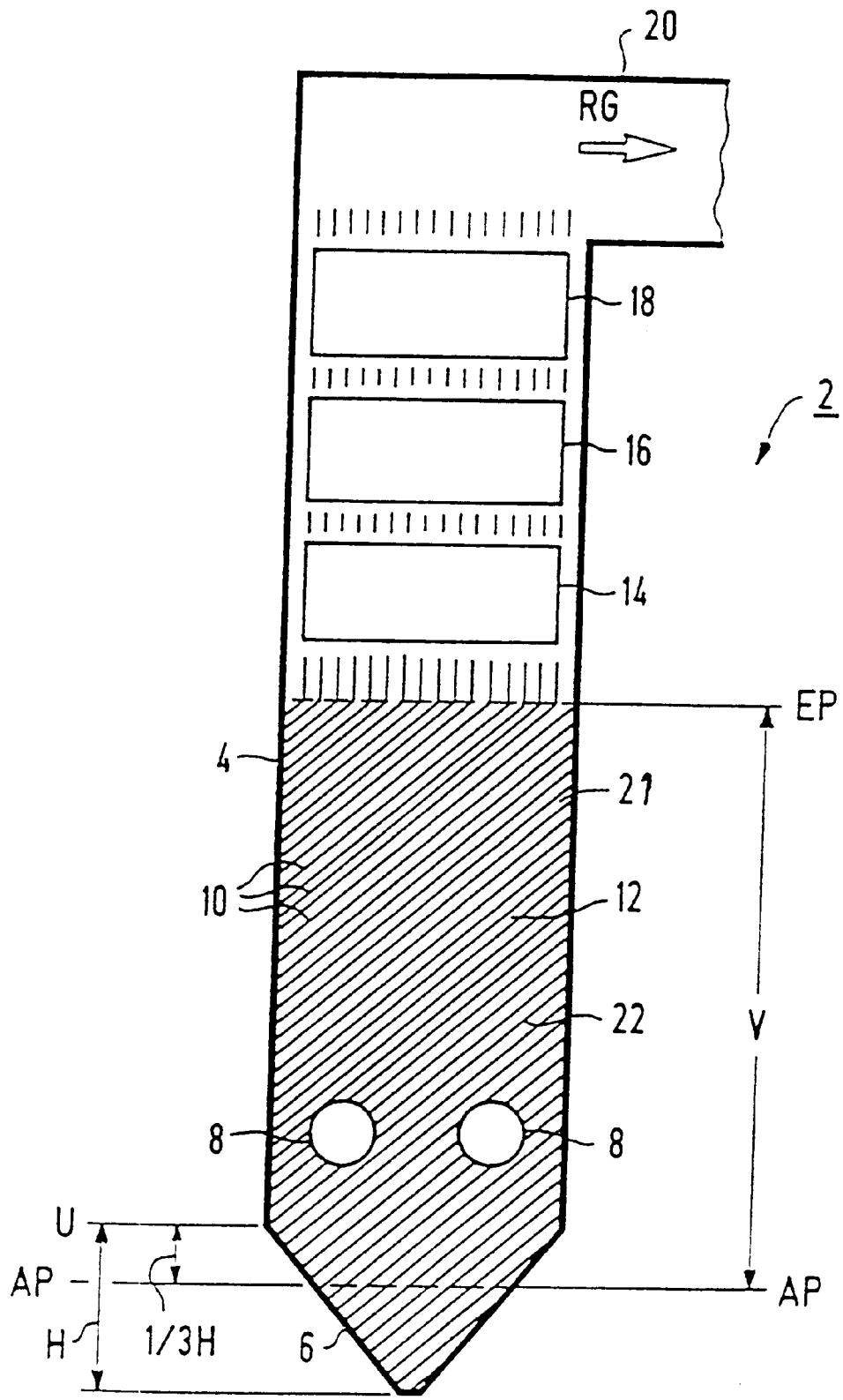
FIG. 1 is a fragmentary, diagrammatic, partly section, simplified representation of a once-through steam generator with a combustion chamber wall having approximately spirally disposed tubes.

Referring now in detail to the figures of the drawings, in which like parts are provided with the same reference symbols, and first, particularly, to FIG. 1 thereof, there is seen a diagrammatic illustration of a once-through steam generator 2 having a rectangular cross-section, with a vertical gas flue that is formed by a containing or combustion chamber wall 4 which merges at a lower end into a funnel-shaped bottom 6.

A number of burners for a fossil fuel are each mounted in a respective orifice 8 in a firing region V of the gas flue. Only two of the orifices 8 can be seen in the combustion chamber wall 4 which is composed of steam generator tubes 10. The steam generator tubes 10 are approximately disposed in a spiral coil in the firing region V. The steam generator tubes 10 are welded to one another in a gas-tight manner to form an evaporator heating surface 12.

Figure 2:
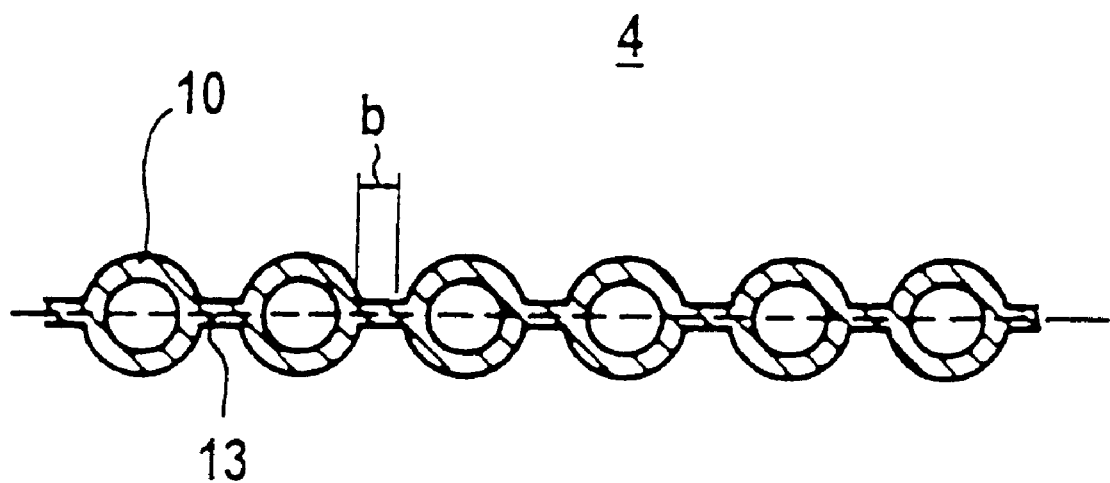
FIG. 2 is an enlarged, fragmentary view of an oblique section through a combustion chamber wall.

As is shown in FIG. 2, the steam generator tubes 10 are welded to one another in a gas-tight manner through fins 13 having a fin width b. The steam generator tubes 10 and the fins 13 form the gas-tight combustion chamber wall 4, for example in a tube/web/tube structure or in a finned-tube structure. The insides of the steam generator tubes have a surface structure for generating a high heat transfer from their inner wall surfaces to a flow medium. Surface structures of this type are described, for example, in German Published, Prosecuted Patent Application 2 032 891.

Convection heating surfaces 14, 16 and 18 are located above the firing region V of the gas flue. Flue gas RG generated as a result of combustion of a fossil fuel leaves the vertical gas flue through a flue-gas outlet duct 20 located above the convection heating surfaces. The flue gas RG serves as a heating medium for water or a water/steam mixture flowing in the steam generator tubes 10.

The steam generator tubes 10 are constructed in such a way that, when the once-through steam generator 2 is in operation, the geodetic pressure loss of the medium flowing through a steam generator tube 10 is at least 0.5 times its pressure loss due to friction. A sufficiently high geodetic pressure loss should be ensured in the steam generator tubes 10 for this purpose, irrespective of the steam output of the once-through steam generator 2. In order to do so, the steam generator tubes 10 are constructed in such a way that points in a coordinate system which are determined by pairs of values of a tube length L in the firing region V and of an outside diameter d of the tube lie approximately on one of the curves or straight lines A, B or C represented in FIG. 3. In this case, the curve A indicates a structural criterion for a once-through steam generator 2 having steam generator tubes 10 which are welded to one another in a gas-tight manner through fins 13 having a fin width b of 12 mm. In contrast, the curves B and C indicate the structural criterion for a fin width b of 16 mm and 20 mm, respectively.

In this case, the tube length L in the firing region V is the average length of a steam generator tube 10 between an initial point AP and a final point EP. The initial point AP is fixed by a lower edge U of the retaining combustion chamber wall 4 plus one third of a height H of the funnel-shaped bottom 6. The final point EP is defined by that point at which the steam generator tubes 10 merge into a vertical configuration or are connected to one another in pressure terms. The inside diameter of the steam generator tubes 10 is larger in an upper region 21 of the firing region V than in a lower region 22 of the firing region V, although not illustrated in the drawing.

We claim:

1. A once-through steam generator, comprising:

a gas flue having a firing region, steam generator tubes with a length L and an outside diameter d, and fins gas-tightly welding said steam generator tubes to one another;

said steam generator tubes connected in parallel for a throughflow of a flow medium;

said steam generator tubes having an inner wall surface and an inner surface structure for generating a high heat transfer from said inner wall surface to the flow medium;

said steam generator tubes disposed approximately in a spiral coil in said firing region; and each of said steam generator tubes constructed in such a way that points in a coordinate system, determined by pairs of values of said tube length L in said firing region and said outside diameter d of said tube, lie approximately along a straight line defined as follows:

points determined by pairs of values L=59.7 m, d=31.8 mm and L=93.6 m, d=44.5 mm for a fin width of 12 mm;

points determined by pairs of values L=64.7 m, d=31.8 mm and L=99.8 m, d=44.5 mm for a fin width of 16 mm; and points determined by pairs of values L=70.6 m, d=31.8 mm and L=106.9 m, d=44.5 mm for a fin width of 20 mm.

2. The once-through steam generator according to claim 1, wherein said firing region has an upper region and a lower region, and said steam generator tubes have a larger inside diameter in said upper region than in said lower region.

* * * * *